(12) United States Patent
Galstian

(10) Patent No.: US 9,989,822 B2
(45) Date of Patent: Jun. 5, 2018

(54) APPARATUS AND METHOD FOR DYNAMICALLY CONTROLLING LIGHT TRANSMISSION

(71) Applicant: LENSVECTOR INC., Sunnyvale, CA (US)

(72) Inventor: Tigran Galstian, Quebec (CA)

(73) Assignee: LENSVECTOR, INC., Sunnyvale, CA (US)

( * ) Notice: Subject to any disclaimer, the term of this patent is extended or adjusted under 35 U.S.C. 154(b) by 571 days.

(21) Appl. No.: 14/504,977

(22) Filed: Oct. 2, 2014

(65) Prior Publication Data
US 2015/0055035 A1 Feb. 26, 2015

Related U.S. Application Data

(63) Continuation of application No. 13/513,671, filed as application No. PCT/CA2010/001934 on Dec. 10, 2010.
(Continued)

(51) Int. Cl.
*G02F 1/1335* (2006.01)
*G02F 1/1347* (2006.01)
(Continued)

(52) U.S. Cl.
CPC ....... *G02F 1/13471* (2013.01); *G02B 3/0006* (2013.01); *G02B 3/14* (2013.01);
(Continued)

(58) Field of Classification Search
CPC ................................................ G02F 2001/294
See application file for complete search history.

(56) References Cited

U.S. PATENT DOCUMENTS 3,741,629 A 6/1973 Kahn
4,774,537 A 9/1988 Moody
(Continued)

FOREIGN PATENT DOCUMENTS

GB 2415703 A 1/2006
WO 2004093332 A2 10/2004
WO 2007098602 A1 9/2007

OTHER PUBLICATIONS

PCT/CA2010/001934 International Preliminary Report on Patentability.
PCT/CA2010/001934 International Search Report.

*Primary Examiner* — Phu Vu
(74) *Attorney, Agent, or Firm* — J-Tek Law PLLC; Jeffrey D. Tekanic; Scott T. Wakeman

(57) ABSTRACT

An apparatus for controlling light transmission from an optical input to an optical output can function as a tunable iris or eclipse, or as a privacy window. The iris/eclipse can use a liquid crystal matrix with a dispersion of dichroic particles that absorb light in one orientation and transmit light in another, such that controlling the liquid crystal with an electric field allows control of the dichroic particles. Alternatively, a layer may be used with a light absorbing liquid or powder material that moves with a charged material in response to a variable electric field applied to the layer. Privacy windows use a plurality of liquid crystal microlenses that can be controlled with an electric field to allow an image of an optical input to be obtainable at an optical output when in a first state, or to render the image irretrievable when in a second state.

8 Claims, 13 Drawing Sheets

Related U.S. Application Data

(60) Provisional application No. 61/330,380, filed on May 2, 2010, provisional application No. 61/285,535, filed on Dec. 10, 2009.

(51) Int. Cl.

| | | |
|---|---|---|
| *G02F 1/1343* | (2006.01) | |
| *G02F 1/137* | (2006.01) | |
| *G02F 1/17* | (2006.01) | |
| *G02B 3/00* | (2006.01) | |
| *G02B 3/14* | (2006.01) | |
| *G02B 5/09* | (2006.01) | |
| *G02F 1/13* | (2006.01) | |
| *G02F 1/1337* | (2006.01) | |

(52) U.S. Cl.
CPC .............. *G02B 5/09* (2013.01); *G02F 1/1313* (2013.01); *G02F 1/1337* (2013.01); *G02F 1/13439* (2013.01); *G02F 1/13475* (2013.01); *G02F 1/13725* (2013.01); *G02F 1/133512* (2013.01); *G02F 1/134309* (2013.01); *G02F 1/172* (2013.01)

(56) References Cited

U.S. PATENT DOCUMENTS

| | | |
|---|---|---|
| 4,893,904 A | 1/1990 | Ohta et al. |
| 6,346,974 B1 | 2/2002 | Itou et al. |
| 2004/0201793 A1 | 10/2004 | Anandan et al. |
| 2007/0229754 A1 | 10/2007 | Galstian et al. |
| 2008/0198281 A1 | 8/2008 | Klein et al. |
| 2010/0001972 A1 | 1/2010 | Jiang et al. |
| 2010/0039595 A1 | 2/2010 | Hayashi et al. |

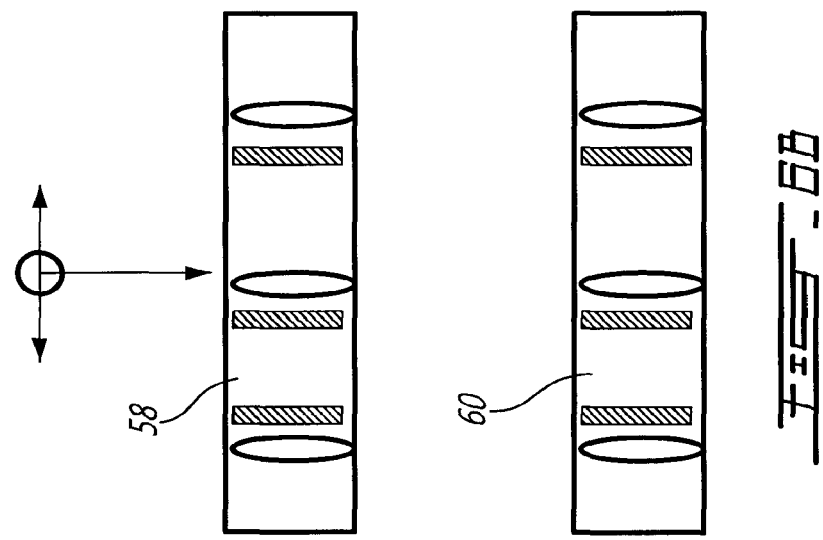
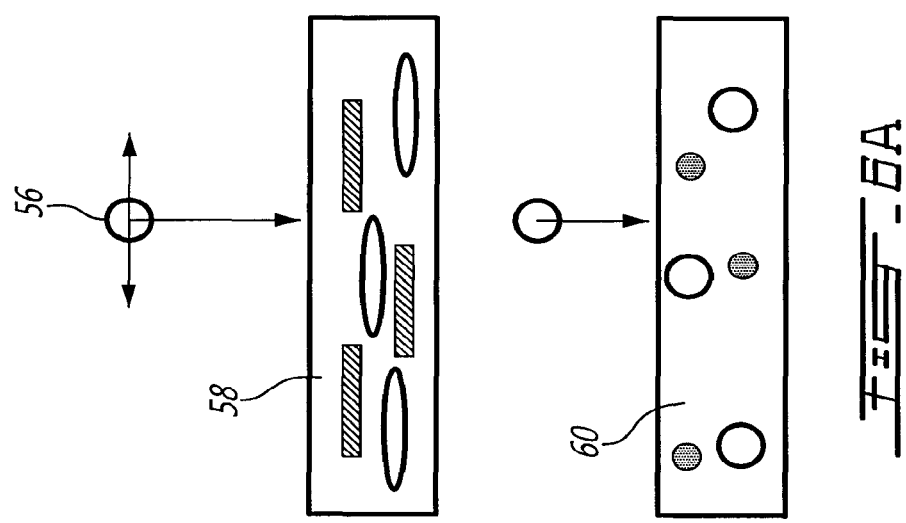

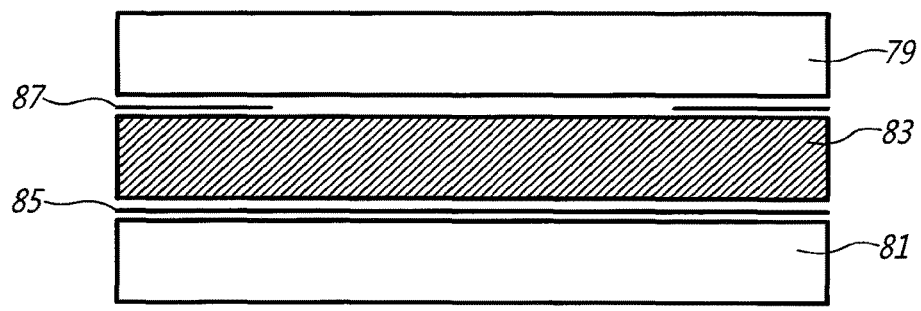
FIG. 9A
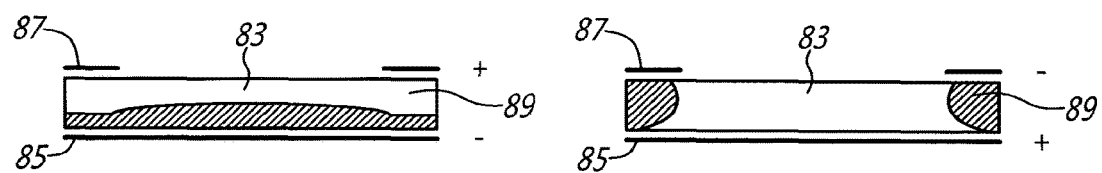
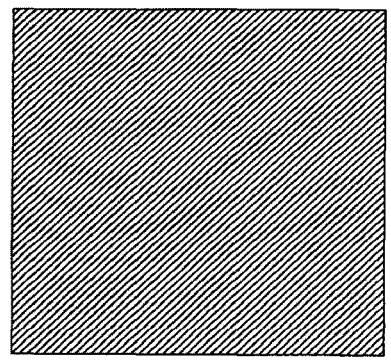
FIG. 9B
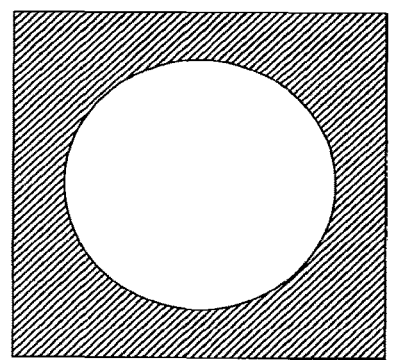
FIG. 9C

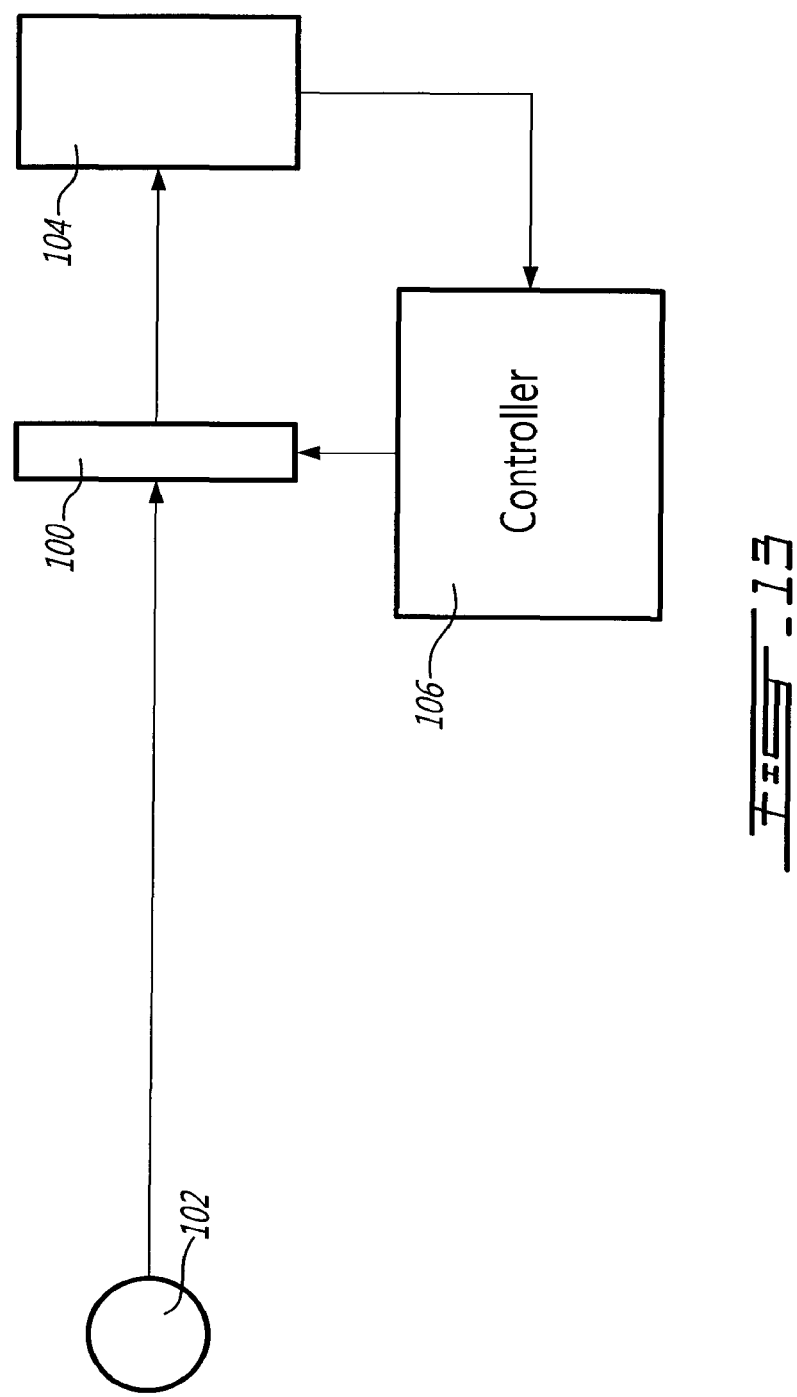

APPARATUS AND METHOD FOR DYNAMICALLY CONTROLLING LIGHT TRANSMISSION

CROSS-REFERENCE TO RELATED APPLICATIONS

This application is a Continuation of U.S. patent application Ser. No. 13/513,671, filed Jun. 4, 2012, which is a US National Phase of PCT International Patent Application PCT/CA2010/001934, filed Dec. 10, 2010, both of which are incorporated herein by reference.

FIELD OF THE INVENTION

This invention relates to the field of electrically controllable optical devices, particularly those using liquid crystal.

BACKGROUND OF THE INVENTION

Adjustable optical diaphragms and optical shutters are known in the art, and make use of mechanical components that open and close to change the amount of light allowed to pass from an input side to an output side. A tunable iris and shutter has also been shown in which a liquid crystal (LC) cell is used between two polarizers. While the tunable shutter is a rather straightforward solution (where one LC cell with two uniform electrodes is positioned between two cross oriented polarizers), the tunable iris was a similar solution but with one of electrodes being of hole patterned form. In addition, certain electrowetting liquid lenses have been used in the past to form tunable light shutters. However, each of these techniques has drawbacks such as a high loss of light (due to the use of two polarizers), and a lack of ability to do intensity modulation with high contrast or to provide variable iris operation.

SUMMARY OF THE INVENTION

In accordance with a first embodiment of the present invention, an apparatus is provided for controlling the cross-sectional area of a transmitting region through which light may pass from an optical input to an optical output. A liquid crystal orienting matrix layer is located between the optical input and the optical output, and a plurality of dichroic particles is dispersed within it. The dichroic particles are influenced by proximate molecules of the liquid crystal matrix such that reorientation of the proximate liquid crystal molecules results in reorientation of the dichroic particles. In a first orientation, the dichroic particles cause no significant obstruction of light between the optical input and the optical output, while in a second orientation they create a significant obstruction of the light. An electric field generation system (or "generator") is used to provide an electric field across the liquid crystal layer that has a dynamically variable spatial profile. This creates a spatially non uniform field strength that causes a reorientation of liquid crystal molecules mainly within a predetermined cross section of the liquid crystal layer. Thus, by changing the spatial profile of the electric field, the size and/or shape of the cross-sectional area through which light may pass is changed.

The electric field generator may make use of a pair of electrodes that includes a spatially uniform electrode and a spatially non-uniform electrode (such as a hole-patterned electrode). A frequency dependent material (which may be, for example, a weakly conductive layer, a high dielectric constant layer or a high resistivity layer) may also be used (along with the whole structure of the cell and its corresponding electric properties) that changes the effective shape of the spatially non-uniform electrode in response to changes in the frequency of an electrical signal driving the electrodes. The overall device may be a layered structure and may include at least one optically transparent supporting substrate to which the liquid crystal layer and the electric field generator are secured. In practice, the cross-sectional area through which light may pass may take any of a variety of different variable shapes. In one embodiment, the cross-sectional area is a variable iris, that is, a cross-sectional area of light transmission that increases from a single point. In another embodiment, the cross-sectional area is a variable eclipse, that is, a cross-sectional area of light obstruction that increases from a single point.

In another embodiment of the invention, the liquid crystal orienting matrix and the plurality of dichroic particles form a first cell that may be controlled to provide variable obstruction of a first light portion having a first polarization. In addition to this first cell there is a second cell that also includes a liquid crystal orienting matrix and a plurality of dichroic particles, the second cell being controllable to provide variable obstruction of a second light portion having a second polarization perpendicular to the first polarization. The use of these two cells together allows the invention to control both perpendicular polarizations of an unpolarized light source at the optical input.

The dichroic particles of the invention may also have a limited wavelength range over which they obstruct light and outside of which the dichroic particles have a relatively higher degree of light transmission. Different types of dichroic particles with different limited wavelength ranges may also be used in the same apparatus. For example, if multiple such different types of dichroic particles are dispersed in multiple different liquid crystal orienting matrixes that are independently controllable, the obstruction of light may be wavelength dependent, allowing the apparatus to have a predetermined spectral response.

A variety of different materials may be used as the dichroic particles. In general, the particles will be significantly longer in one dimension than in others, and they may be organic or non-organic materials. In one particular embodiment, the particles are carbon nanotubes.

As an alternative to using a liquid crystal orienting matrix with dispersed dichroic particles, an apparatus for controlling the cross-sectional area of an optical transmitting region may make use of a control layer located between an optical input and an optical output. This layer contains a light absorbing material consisting of finely dispersed discrete elements, such as a liquid or powder, and also includes a charged material with which the discrete elements move within the liquid layer. The light absorbing material may be the same as the charged material, such as a light absorbing black liquid, or may be particles or other material that is entrained with a charged liquid. An electric field generator provides an electric field (across the liquid layer) that has a dynamically variable spatial profile. By changing the spatially dependent field strength of the electric field the charged material (and therefore the light absorbing material) in the liquid layer may be relocated. The electric field generator may include a spatially uniform electrode and a spatially non-uniform electrode (such as a hole-patterned electrode). In addition, an optically transparent supporting substrate may be used to which the liquid layer and the electric field generator are secured. As in other embodiments, the cross-sectional shape of the transmitting region may be a variable iris, a variable eclipse, or some other desired shape.

In another embodiment of the invention, an apparatus is provided that controls the transmission of an image from an optical input to an optical output. Such an apparatus may be referred to as a privacy window, and may use one or both of light obstruction and light focusing to render an image of an optical input irretrievable from an optical output. This embodiment of the invention uses a plurality of liquid crystal lenses located in a first layer positioned between the optical input and the optical output. These lenses (which may be very small "microlenses") are arranged side-by-side in a direction substantially perpendicular to a light propagation direction between the optical input and the optical output. The liquid crystal lenses are electrically controllable to change from a state of substantially zero optical power to a state of significantly higher optical power. A controller is used to control the liquid crystal lenses to change from a first of said states to a second of said states. In the first state, an accurate image of the optical input is readily obtainable from the optical output while, in the second state, no accurate image is obtainable. Depending on the application, the first state may be when the lenses are at zero optical power and the second state when they are at a higher optical power, or vice versa.

In a variation of this embodiment, a second layer is positioned between the liquid crystal lens layer and the optical output. The second layer includes a material that has an enhanced Fresnel reflection at higher incident angles such that light that is substantially perpendicular to the layer passes through it unimpeded, while light rays having an angle of incidence greater than a predetermined amount are reflected by the layer.

In another variation of this embodiment, two layers of liquid crystal lenses are arranged parallel with each other such that their lenses are aligned in a direction along which light passes from the optical input to the optical output. Between these two layers is positioned an aperture layer that is opaque except for a plurality of apertures each aligned with an optical axis passing through adjacent lenses of the first and second liquid crystal layers. The apertures each have a cross-sectional area significantly smaller than that of the lenses such that, when the lenses are in a state relatively low optical power, a majority of light passing through a lens of the first layer is blocked by the aperture layer before reaching the corresponding lens of the second layer. However, when the lenses are in a state of relatively high power, the majority of light reaching each lens of the first layer is focused through its corresponding aperture and is incident on the corresponding lens of the second layer. Each corresponding lens of the second layer then recollimates the light so that an image of the optical input is readily available at the optical output.

BRIEF DESCRIPTION OF THE DRAWINGS

FIG. 6A is a schematic side view of the two cells of the iris device of FIG. 5 when the device is in a completely closed state.

FIG. 6B is a schematic side view of the two cells of the iris device of FIG. 5 when the device is in a completely open state.

FIG. 9A is a schematic view of an embodiment of a variable iris according to the invention that uses a charged light absorbing material in a liquid layer.

FIG. 9B is a schematic view of the liquid layer region of the iris of FIG. 9A when the iris is in a closed state.

FIG. 9C is a schematic view of the liquid layer region of the iris of FIG. 9A when the iris is in an open state.

FIG. 13 is a schematic view of a system for preventing an excess of optical energy from reaching a photosensitive device.

DETAILED DESCRIPTION

Figure 1:
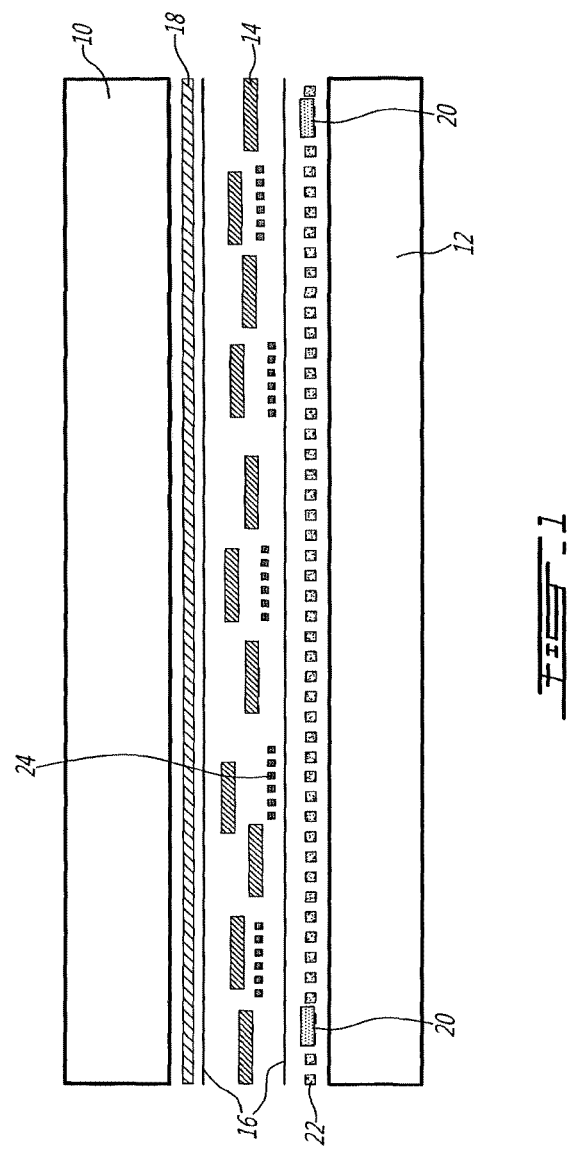
FIG. 1 is a schematic view of a tuneable optical transmission device according to the present invention.

Shown in FIG. 1 is a tunable liquid crystal (LC) device according to the present invention. The structure has a top substrate 10 and a bottom substrate 12 in between which is located a LC layer 14. As is known in the art, alignment layers 16 to either side of the LC layer are used to provide the liquid crystals in the layer with a uniform alignment and pre-tilt, such that they all rotate in the same direction under the influence of an external electric field. In the present embodiment, an electric field is provided across the LC layer 14 using two optically transparent electrodes, a uniform electrode layer 18 positioned adjacent to top substrate 10, and a hole-patterned electrode 20 positioned adjacent to the bottom substrate 12. Also provided is a layer 22 of frequency dependent material (such as a high dielectric constant, high resistivity or weakly conductive material) that is also optically transparent, and that, in combination with the whole structure of the device (substrates, separated electrodes, etc.), responds differently to different frequencies of signals applied to the electrode pair, so that the effective profile of the electric field is frequency dependent.

Dispersed in the LC layer 14 of the FIG. 1 embodiment is a dichroic absorbant material 24. The dichroic material may be any of a number of different commercially available materials that have a particulate structure for which the base particles have a very high length-to-diameter ratio. These materials may be organic or inorganic, and have the character of providing a huge anisotropy of absorption, i.e., dichroism. The base particles may be based on particularly long macromolecules or on microstructures such as carbon nanotubes. Carbon nanotubes can be particularly useful in that a very high length-to-diameter ratio (e.g., above 1000) can be achieved. With the dichroic material 24 dispersed in the LC layer, the liquid crystal acts as an orienting matrix for the dichroic particles, that is, the particles tend to line up with the same spatial orientation of as the liquid crystal molecules. Thus, when the liquid crystal molecules are oriented so that they are parallel to the direction of light propagation passing through the structure, the base particles of the dichroic material are likewise parallel to the light propagation direction. Conversely, when the liquid crystal molecules are perpendicular to the light propagation direction, so are the base particles of the dichroic material. Thus, as the orientation of the liquid crystal molecules may be controlled with an electric field, so may the orientation of the dichroic particles.

The use of a layer 22 of frequency dependent material as part of a liquid crystal lens is described in co-pending PCT Patent Applications Nos. PCT/CA2009/000743, and PCT/IB2009/052658, publication Nos. WO 2009/146530 and WO 2009/153764 published on Dec. 10, 2009 and Dec. 23, 2009, respectively, which are assigned to the assignee of the present invention, and the subject matter of which is incorporated herein by reference. The spatial variation in the electric field profile creates a variation in the refractive index across the LC layer, resulting in a lens-like structure. In the present embodiment, however, the use of dichroic particles creates a variable transmission area, in this case an "eclipse," for which the size of a light-transmitting opening may be dynamically controlled by controlling the voltage and/or frequency of the electric field. Whereas the control of the structure in the aforementioned prior application creates variation in the effective lens power, the present embodiment provides no significant lensing effect but, rather, a variable opening through which light may pass. The liquid crystal layer may be made very thin to avoid a lensing effect, and this thin profile should carry a sufficient number of dichroic particles to provide a good extinction ratio. Thus, a very thin, variable light transmission device is provided for which there are no mechanical parts.

Figure 2:
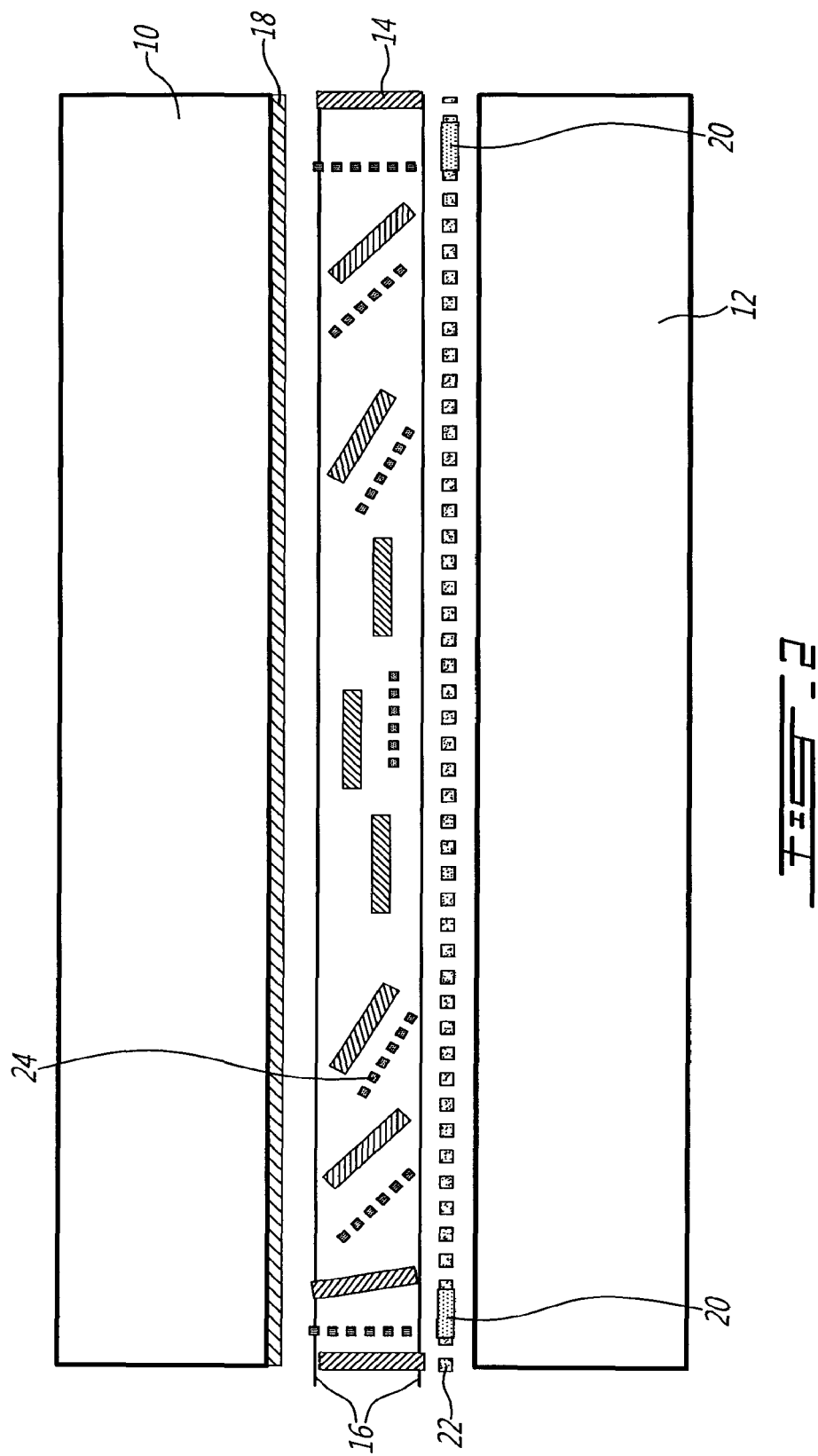
FIG. 2 is a schematic view of a tuneable optical transmission device, such as that of FIG. 1, in a partially open state.

The position of the dichroic particles depicted in FIG. 1 is such that all are aligned so that they provide the maximum absorption, that is, their long axes are parallel to the polarization of light (i.e., perpendicular to the direction of the light propagation). As the power of the contoured electric field is changed, the orienting matrix (in this case an LC layer) begins to realign according to the localized strength of the field, and the dichroic particles are realigned with it. Thus, as shown in FIG. 2, for the electrode configuration of FIG. 1, the rotation of the particles is most pronounced toward the periphery of the device (for a LC material having positive dielectric anisotropy at the driving frequency), resulting in a minimum absorption at the periphery. Particles toward the center of the device, however, are minimally affected by the field, and remain in a maximum absorption orientation. Thus, light at the center of the device passes through with maximum attenuation, while light at the exterior (periphery) is affected minimally. In between these extremes, the particles are in various states of realignment, the degree of realignment changing from the periphery toward the center. Thus, we obtain an electrically tunable "eclipse" (transmission annulus) device. As the strength of the electric field is gradually increased, the size of the region for which the particles are significantly realigned continues to grow, and the resulting annular transmission zone continues to grow in size.

Figure 3:
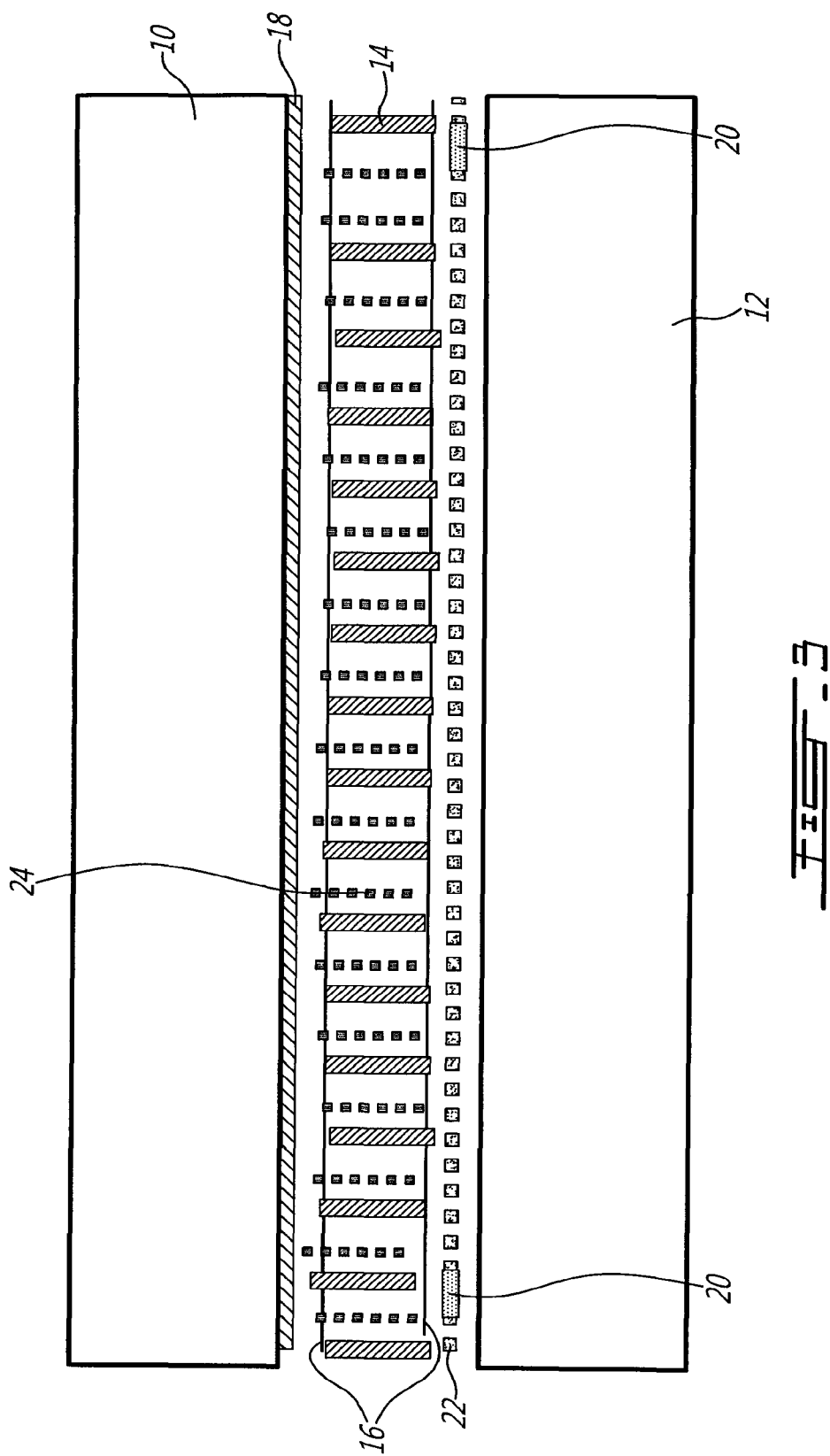
FIG. 3 is a schematic view of a tuneable optical transmission device, such as that of FIG. 1, in a completely open state.

The application of a relatively high voltage (ideally with a relatively low frequency) to the electrodes of the FIG. 1 configuration results in a complete realignment of the entire orienting matrix and, correspondingly, of all of the dichroic particles. In this condition, as shown in FIG. 3, the all of the dichroic particles are effectively parallel to the direction of light transmission and, as such, have a minimal absorptive effect on the light. As such, the device has no significant effect on the light transmission, and the cross sectional size of light transmission path is defined by the limits of the device.

The realignment of the liquid crystals and, correspondingly, the dichroic particles is accomplished in this embodiment by controlling the strength and spatial distribution of the electric field. As mentioned above, the use of a frequency dependent material layer 22 allows the shape of the electric field to be controlled by changing the frequency of the signal applied to the electrodes. The material has the characteristic of allowing a limited degree of charge mobility through it, and that degree of charge mobility is dependent on the frequency of the electrical signal applied to the device. In addition, the manner in which it is deposited on a substrate, the positioning of other elements and their configuration (e.g., the spatial separation of electrodes and the dielectric constants of materials involved) make the whole device frequency dependent. Thus, for a given frequency dependent material and device configuration, an electrical signal of relatively low frequency may result in a high degree of charge movement (transport distance) in the material, while a relatively high frequency results in a relatively low degree of charge mobility. When using the frequency dependent material in conjunction with an electrode pair that generates an electric field in response to an applied drive signal, the extent of charge mobility determines the depth of penetration of charge into the material and, therefore, the portion of the material that behaves like a conductive layer in the context of electric field formation. Thus, with a high degree of charge movement, a larger segment of the material will appear as a conductor and therefore appear as an extension of a nearby electrode. This frequency dependent characteristic is therefore used in the present invention to create dynamically configurable effective electrode surfaces which may be changed by changing the frequency of the drive signal. Changing the effective electrode profile in this manner results in a corresponding change in the profile of an electric field between the two electrodes. With an LC layer located between the electrodes, the dynamically changeable electric field profile may thus be used to dynamically change the optical properties of the LC layer.

Figure 4:
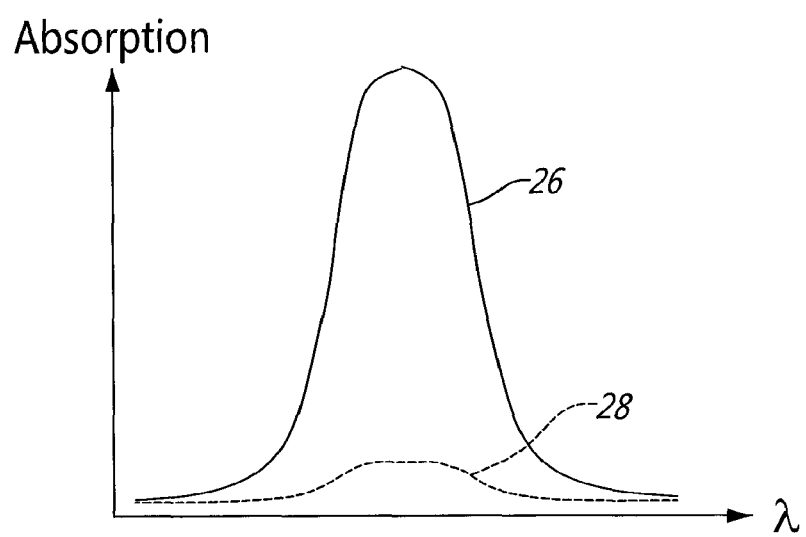
FIG. 4 is a graphical view of spectral absorption characteristics for the material used for a tunable iris such as that of FIG. 1 for two perpendicular light polarizations.

While FIGS. 1-3 show the full range of realignment of the liquid crystals and dichroic particles by an applied electric field, the light absorbing quality of the layer applies only to one polarization of light passing through the device. This polarization dependency is demonstrated graphically in FIG. 4. As shown, the light polarization component that is parallel to the dipole of the absorbant (indicated at 26) is highly absorbed in the corresponding wavelength range. In contrast, the light polarization component that is perpendicular to the dipole of the absorbant (indicated at 28) has a correspondingly low degree of absorption in the corresponding wavelength range.

Figure 5:
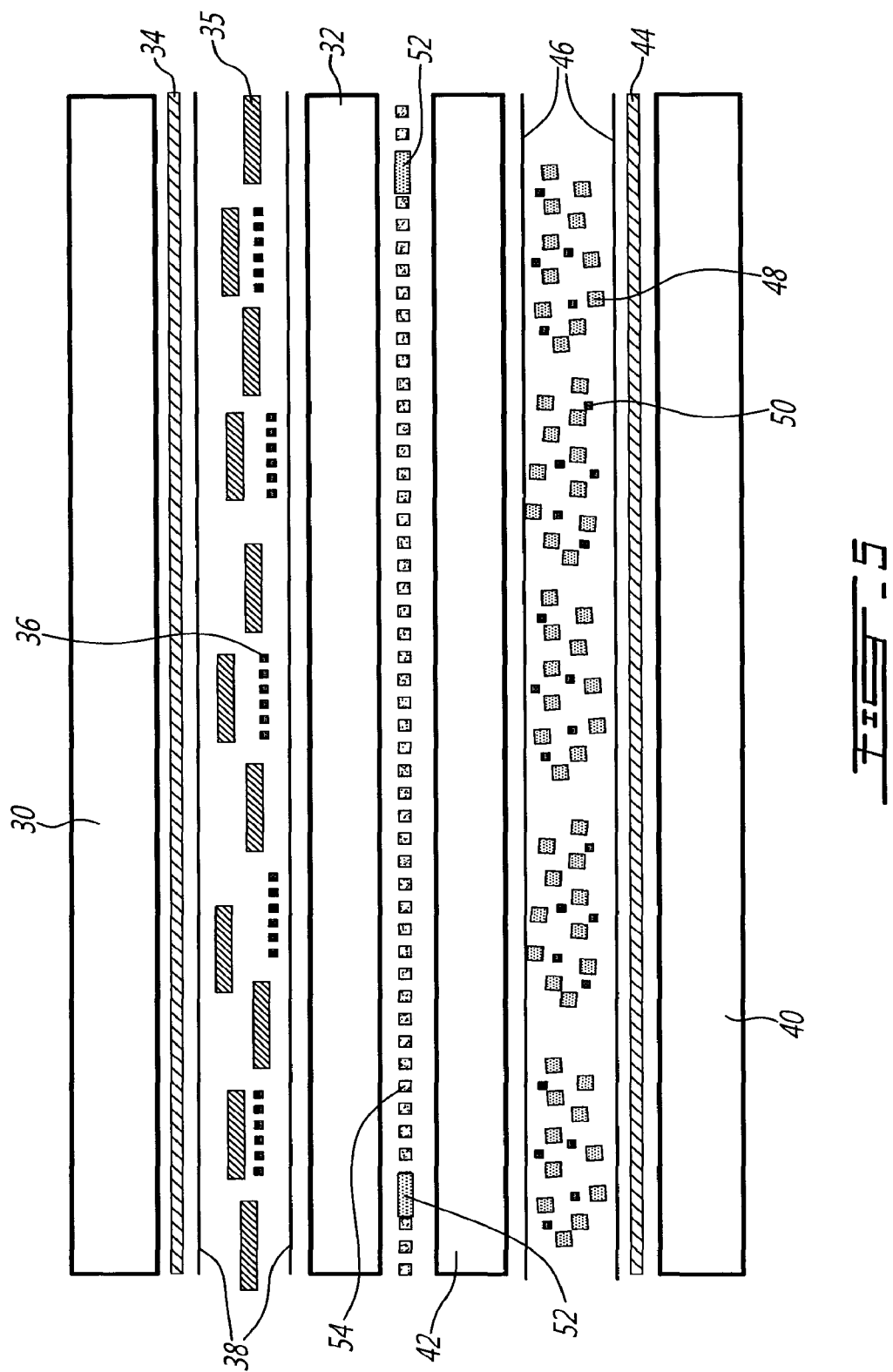
FIG. 5 is a schematic view of a tunable iris having two cells with cross orientation of their polarization axes to handle natural (unpolarized) light.

Because of the polarization dependency of the device shown in FIGS. 1-3, an alternative embodiment is also provided in which the device is polarization independent. Shown in FIG. 5 is a tunable device that makes use of two cells having cross orientation of their polarization axes, that is, the axes of light polarization that they absorb. A first cell includes top substrate 30 and intermediate substrate 32. Adjacent to the top substrate is a uniform, optically transparent electrode 34. An active layer between the top substrate 30 and intermediate substrate 32 includes an orienting liquid crystal matrix 35 and a dichroic dopant 36. Alignment layers 38 to either side of the active layer provide a common pre-tilt angle for the liquid crystal molecules, as is known in the art, ensuring that all of the molecules will move in the same direction upon application of an electric field. In addition, the liquid crystal and dichroic dopant of this layer are oriented so as to have maximum interaction with a first polarization of light passing through the device.

A second cell of the device includes bottom substrate 40 and intermediate substrate 42. As with the top cell, a uniform, optically transparent electrode 44 lies adjacent to the bottom substrate, and an active layer between the substrates 40, 42 has an alignment layer 46 located to either side of it. The active layer contains both a liquid crystal 48 and a dichroic dopant 50. However, the orientation of these liquid crystal molecules and the dichroic particles have an orientation that is perpendicular to that of the first cell, and have their maximum interaction with a second polarization of light passing through the device that is perpendicular to the first polarization.

The two cells of the FIG. 5 device share an annular electrode 52 and a frequency dependent layer 54. These layers are similar to those of the embodiment shown in FIGS. 1-3, such that they may be used to define a spatial profile of a field applied to the two layers. The change in the frequency of the signal applied to electrodes 34, 44 and 52 changes the extent to which the frequency dependent layer is active and, correspondingly, changes the effective shape of the electric field that interacts with the active layers of the two cells. The changing of the field shape changes the effective transmission area created by the two layers. However, since each of the two layers is absorbent at a different one of the two perpendicular polarizations of the incident light, the effect of the tuneable device is polarization independent.

The polarization independent effect of the embodiment of FIG. 6 is depicted in FIGS. 6A and 6B. In FIG. 6A, unpolarized light 56 encounters the first cell 58, where the orienting matrix and dichroic absorbant are oriented so as to absorb strongly at the parallel polarization of the light. The perpendicular polarization passes through the first cell largely undiminished, but is absorbed at the second cell 60, where the orienting matrix and the dichroic absorbant are oriented so as absorb strongly at this other polarization. The example of FIG. 6A, of course, is for the condition when the electric field of the device is controlled so as to effectively close the device, that is, to orient all of the dichroic particles perpendicular to the direction of the light. If the electric field is controlled so that the liquid crystal molecules (and, hence, the dichroic particles) are parallel to the light propagation direction, there is very little absorption. This situation is shown schematically in FIG. 6B, where the profile of the electric field is such that dichroic particles of both cross oriented cells 58, 60 are oriented parallel to the light propagation direction. Thus, both light polarizations are only weakly absorbed by the device.

Figure 7A:
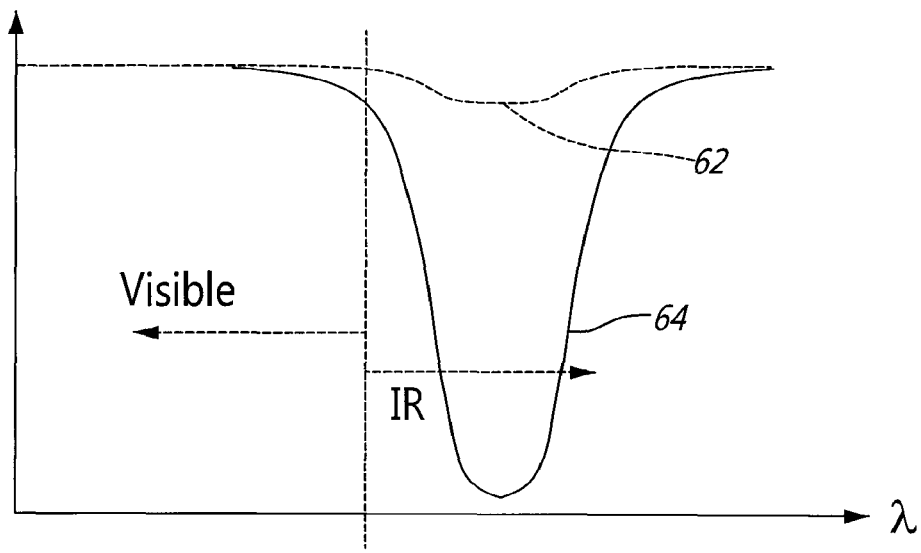
FIG. 7A is a graphical view of the spectral response of a tunable iris according to the present invention that has a limited spectral absorption range.

Different types of absorbant materials are discussed above. Notably, most dichroic dopants have a well-defined spectral range of absorption. Thus, for a device using one particular type of dichroic material, the transmissivity will have a particular spectral characteristic. Shown graphically in FIG. 7A is a possible transmission spectrum for a tunable device according to the present invention. The two curves shown in the graph include curve 62, which depicts the transmission when the dichroic particles are aligned with the propagation direction of the light (i.e., in an orientation of minimal absorption), and curve 64, which depicts the transmission profile when the particles are aligned perpendicular to the direction of light propagation (i.e., in an orientation of maximal absorption). In each case, the spectral range of absorption is limited to a predetermined wavelength band, and outside of that band there is little or no light absorption. Thus, the selection of the dichroic material may take into account a desired spectral band.

Figure 7B:
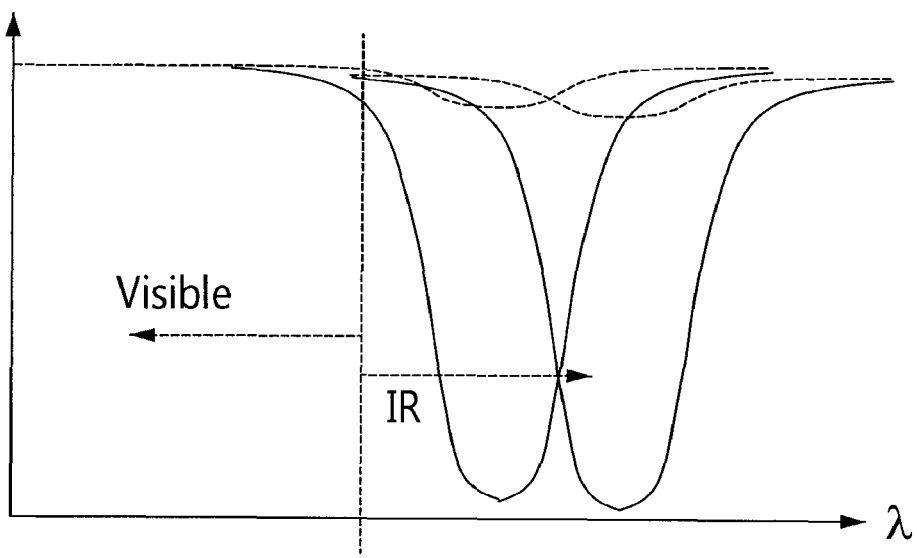
FIG. 7B is a graphical view of the spectral response of a tunable iris according to the present invention that has multiple different spectral absorption ranges.

In certain circumstances, it may be desirable to have absorption at multiple spectral bands. Thus, in another embodiment of the invention, the tuneable light transmission device uses multiple dichroic dopants with different absorption characteristics. This may be accomplished using a single orienting matrix, such as a layer of liquid crystal, to which is added dichroic molecules having different wavelength absorption characteristics. Moreover, the proportion of the different dopants may be selected according to a desired wavelength response of the device. For example, a tunable device may have an active layer with dichroic particles, twenty-five percent of which are absorptive in a first wavelength range, and seventy-five percent of which are absorptive in a second wavelength range. Another device may use more than two different dopants, each in a desired relative proportion. In short, the spectral response of the system may be shaped by providing different dichroic materials in different relative quantities. FIG. 7B shows an example for which two different dopants having different, adjacent spectral responses are used together to create an overall wavelength response that is much wider than if only one dopant type were used.

Figure 8:
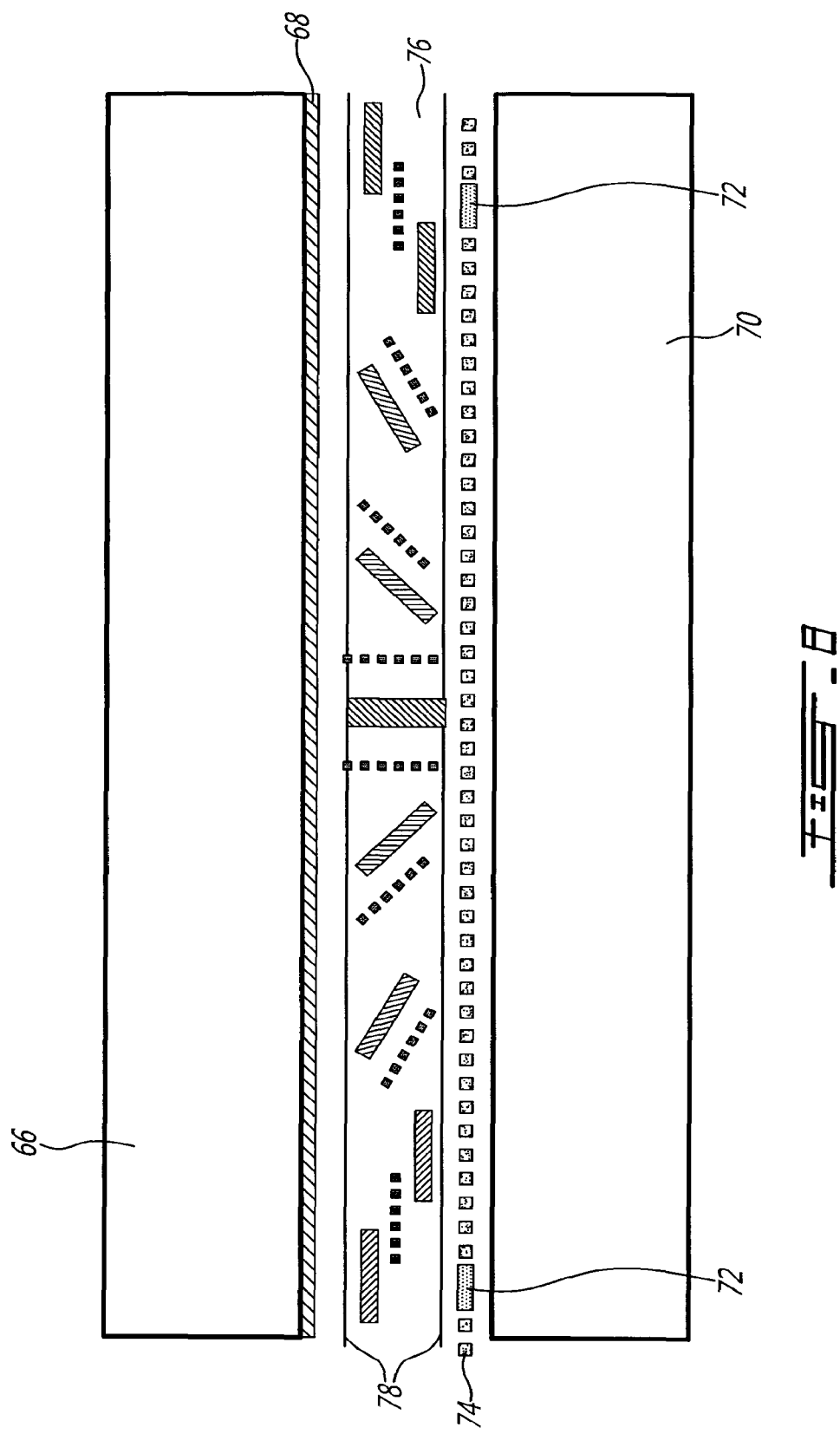
FIG. 8 is a schematic view of a tuneable optical transmission device according to the present invention that takes the form of an iris.

While the previous embodiments have been directed to a tunable eclipse, it should be understood that the invention encompasses a variety of different shapes to which the basic principle of variable light occlusion may be applied. For example, in FIG. 8, a variable iris (diaphragm) is shown in which a change in applied electric field, rather than changing the size of a transmissive region at the periphery of the device, changes the size of a transmissive region in the central part of the device. In this particular example the device has a centered circular profile, so that the zone of transmission is a "hole" of variable size. A top substrate 66 has an adjacent, uniform, optically transparent electrode 68, and a bottom substrate 70 has an adjacent, peripheral electrode 72 and layer 74 of frequency dependent material. The active layer 76 includes a liquid crystal orienting matrix (with, for example, a negative dielectric anisotropy), as well as a dopant of dichroic particles. Adjacent the active layer 76 are alignment layers 78 but, in this embodiment, the initial alignment of the liquid crystal molecules, and therefore the dichroic particles, is perpendicular to the substrates of the cell (parallel with the direction of light propagation). However, the dielectric anisotropy of the LC matrix here must be negative at the driving frequency to allow the electric field to change the orientation of LC molecules by the dielectric "repulsion" effect. Thus, the active layer is highly transparent until the application of an electric field. With an electrode signal at an appropriate frequency and voltage, the profile of the electric field is such that the liquid crystal molecules along the periphery of the device undergo a strong reorientation, making this region of the active layer highly opaque to the incident light. Thus, a central transmission region is created, and the size of this region may be increased by changing the electrode drive signal (in magnitude and/or frequency) to increase the electric field strength toward the center of the device. In response to this change, more of the liquid crystal molecules toward the center of the device are realigned, and the adjacent dichroic particles with them, decreasing thus the size of the transmission region.

Those skilled in the art will understand that different electrode configurations may be used to create different types of variable light blocking devices. The foregoing embodiments make use of a planar electrode and a peripheral electrode, but other electrode shapes may also be used. In addition, the use of a frequency dependent material layer is not mandatory, and the spatial profile of the electric field may be varied in other ways, such as by changing the voltage applied to the electrode structure. A frequency dependent material may also be implemented in different forms, such as by including an independent layer of high dielectric constant material. Another manner of providing a frequency dependent material would be to introduce it directly into the active layer. It is also anticipated that LC molecules may be used that themselves function as dichroic absorbents.

In another embodiment of the invention, light-absorbing medium having charged material is used with an electrode pair. Shown in FIG. 9A is a schematic view of a device having a top substrate 79, a bottom substrate 81 and a central liquid or powder layer 83. To one side of the liquid layer 83 is a uniform electrode 85 while, to the other side of the layer 83 is a hole-patterned electrode 87. The layer 83 contains light absorbing (e.g., black) material that is either charged or entrained with a charged material in the layer. For example, the absorbing material may be a light absorbing charged liquid, it may be charged light absorbing particles dispersed within a liquid, or it may be light absorbing particles entrained by a charged liquid. By application of an electric field having a particular spatial profile, the light absorbing material may be thereby relocated in the layer.

An example of this embodiment is shown in FIG. 9B, where an electrical potential is applied to the uniform electrode 85 and the hole-patterned electrode 87 (the substrate layers 79, 81 are omitted from this figure for clarity). In this example, the charged material 89 has a net positive charge and the potential is applied with the negative potential applied to the uniform electrode 85. As such, the absorbent material is distributed across the entire area of the liquid layer. Those skilled in the art will recognize that this condition may also be possible with the application of no potential, if the neutral state of the liquid provides for a relatively uniform distribution thereof. Also shown in FIG. 9B is a schematic view of the device in the along the intended light direction. As indicated, the uniform distribution of the light absorbing material maintains the device in a non-transmitting state.

When an opposite potential is applied to the electrodes of the device, that is, when the positive potential is applied to the uniform electrode 85 and the negative potential is applied to the hole-patterned electrode 87, the positively charged material is attracted to the hole-patterned electrode, which resides only along the periphery of the devices. As such, the light absorbing material 89 is moved to the periphery of the liquid layer, thereby creating a transmitting window, or iris, within the center of the device. The schematic view in FIG. 9C along the intended light direction shows the iris in a fully open state. However, those skilled in the art will recognize that the size of the iris may be dynamically changed by changing the magnitude of the potential applied between the two electrodes 85, 87. It will also be understood that the hole-patterned electrode example is only one possible shape, and that other electrode configurations may be used to create variable light obstructing shapes as may be desired for a particular application.

In another embodiment of the invention, an optical device having an electrically controllable layer may be used to create "privacy windows." A privacy window is an optical device that may be controlled to affect the passage of light through the device such that, in one mode, the light passes without significant distortion while, in a second mode, the light is interfered with so as to inhibit any significant image from the side of the device from which the light originated. A first embodiment of such a device is shown schematically in FIGS. 10A and 10B. This first embodiment describes a privacy window which does not change the total transmitted light energy (this can be useful to maintain the energetic balance, etc.) but destroys the image.

Figure 10A:
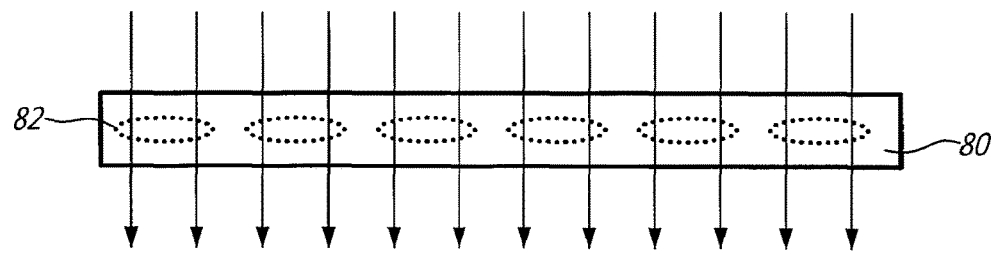
FIG. 10A is a schematic view of a first embodiment of a variable privacy window according to the present invention when the window is in an open state.

As shown in FIG. 10A, a substrate has mounted within it an array of microlenses 82. The array of microlenses may be a two-dimensional array, and it may or may not be an ordered array. The lenses themselves may be of equal sizes or of different sizes, and each is a liquid crystal lens structure as is known in the art. However, rather than using a single lens to do focusing of incident light for creating a usable image, the multiple microlenses operate to work in unison, when activated, to obscure the image. The lenses may use known electrode structures, such as indium tin oxide (ITO) layers, and those layers may be index matched to reduce light losses from scattering, diffraction and reflection. In a first mode, shown in FIG. 10A, the microlenses are in a zero optical power state, such that light passes through them essentially unaltered. Since the microlenses 82 are positioned very close to one another, there is little loss of light, and an accurate image of the source of the light is readily obtainable.

Figure 10B:
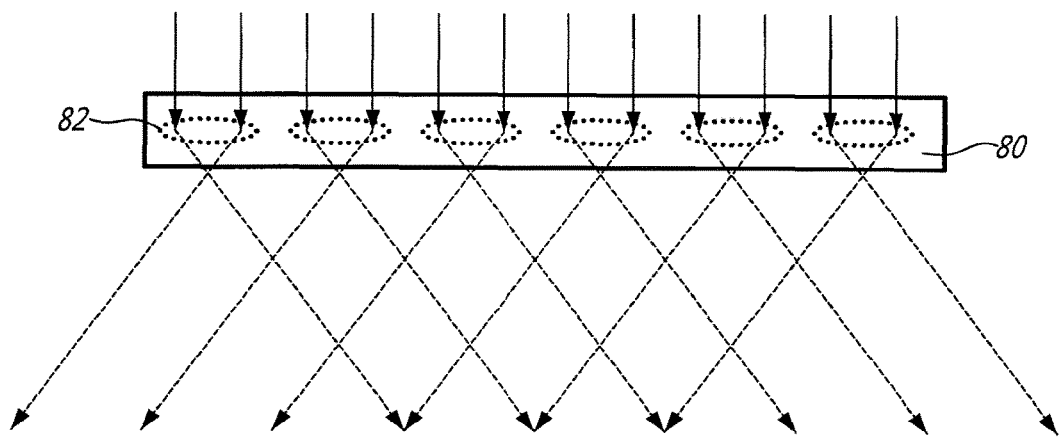
FIG. 10B is a schematic view of the variable privacy window of FIG. 10A when the window is in a closed state.

When an electric field is applied to the microlenses 82 to create a significant focusing power in each, the light entering each of them is focused to a point close to or within a surface of the device. This effect is shown schematically in FIG. 10B, with the light rays indicated as being strongly focused by each of the microlenses. As a result, the light rays are completely out of focus at any possible viewing point on the side of the device opposite the light source, and any accurate observation of objects on the source side of the device is rendered impossible. Thus, while an object on the source side may be readily viewed from the opposite side when the microlenses are at zero power, as shown in FIG. 10A, the activation of the lenses as shown in FIG. 10B obscures the image to the point at which observation of the source side is rendered impossible. That is, the total transmitted light is essentially the same, but the image is destroyed. This method is advantageous in that a low control voltage may be used, there are no complex chemical manufacturing steps involved and there is a high degree of stability. Moreover, the components can be made using standard lithography and other manufacturing techniques.

Figure 11A:
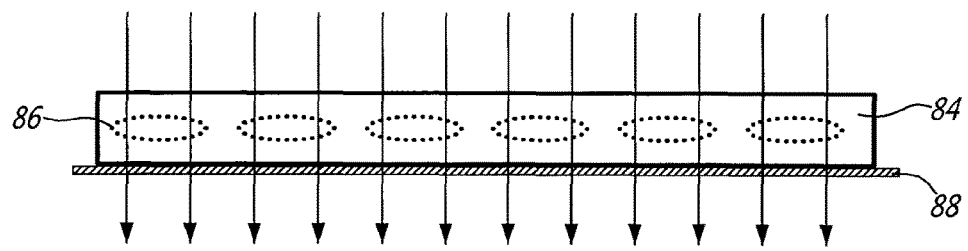
FIG. 11A is a schematic view of an alternative embodiment of a privacy window according to the present invention when the window is in an open state.
Figure 11B:
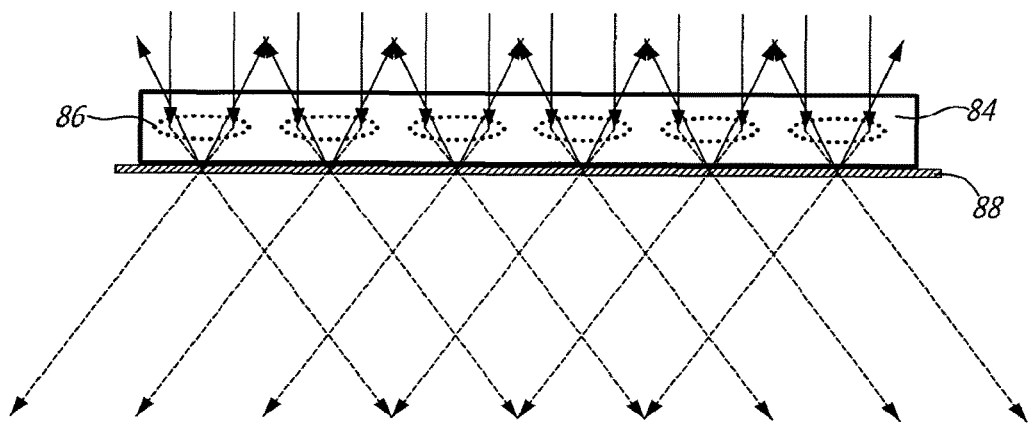
FIG. 11B is a schematic view of the privacy window of 11A when the window is in a closed state.

In another embodiment, shown in FIGS. 11A and 11B, image destruction also results from switching the lenses to a non-zero optical power, but the total transmitted optical energy is changed with activation of the device. In FIG. 11A, a privacy windows device includes a substrate 84 with multiple microlenses 86 located therein. In addition, there is a layer 88 which may be a coating on the exit surface of the substrate 84. The layer 88 is selected to provide an enhanced Fresnel reflection at higher incident angles but that allows light that is substantially perpendicular to the layer 88 to pass through it unimpeded. However, upon activation of the microlenses 86, the light is focused at each of the lenses, and the light rays having an angle greater than a predetermined amount (e.g., five degrees) are reflected by the layer 88. Thus, as shown in FIG. 11B, the portions of each focused "microbeam" that exceed the critical angle of the layer 88 are reflected, and their optical energy does not pass through the device. Thus, in this embodiment, the image of the source side is still destroyed and not visible from the output side, but only a portion of the optical energy passes entirely through the device.

Figure 12A:
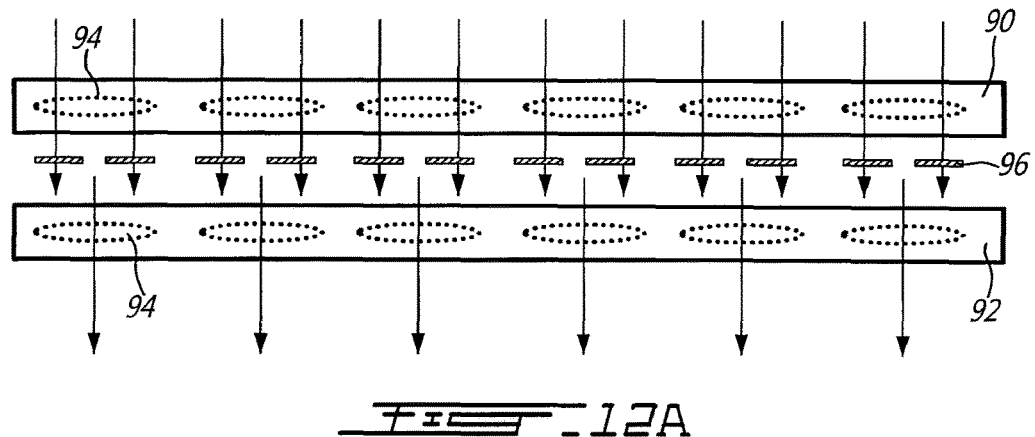
FIG. 12A is a schematic view of an embodiment of a privacy window according to the present invention that uses multiple cells when it is in a closed state.
Figure 12B:
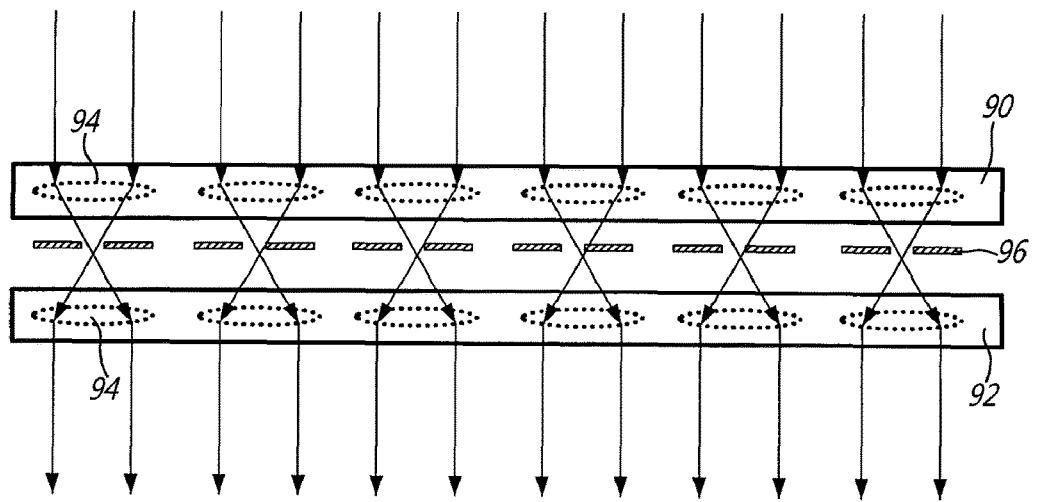
FIG. 12B is a schematic view of the privacy window of FIG. 12A when it is in an open state.

Shown in FIGS. 12A and 12B is a privacy windows embodiment that makes use of enhanced "vignetting." The structure includes a top substrate 90 and a bottom substrate 92, each of which has a series of microlenses 94, the microlenses of each substrate being aligned with those of the others. The microlenses in the preferred embodiment are tunable (e.g., liquid crystal or other type of) lenses that have zero optical power in a first state and that, under the influence of an appropriate electric field have a predetermined optical power. Between the two substrates is located an aperture layer which may be a set of rings 96 each of which is aligned with one of the microlens pairs such that, when the microlenses 94 are at zero power, only a small amount of light passes through the device, namely, through the hole in the middle of each ring. Since this is a relative small amount of light overall that passes from the source side to the output side of the device, it is impossible to view an accurate image of the source side from the output side.

When the microlenses 94 are activated using an appropriate electric field, each of the microlenses of the substrate 90 focuses the light incident upon it onto a corresponding microlens 94 of the substrate 92. The microlenses of the substrate 94 also have an optical power, and each recollimates the light it receives from the its corresponding lens in the substrate 92. The focusing of the light between the microlenses of the two substrates is such that all of the focused light passes through the rings 96 unimpeded and, since it is recollimated at the substrate 92, is effectively identical to the light incident on the microlenses of substrate 90. Thus, in the focused state, the device allows the viewing of the source side of the device from the output side. However, in the unfocused state, the majority of the light is blocked by the rings 96 and the corresponding image is destroyed.

FIG. 13 illustrates an example of a camera that uses a feedback loop to control the optical shutter as a function of light intensity detected at an image sensor plane. A privacy windows or shutter device 100, such as those shown in the previous embodiments, is positioned between a light source 102 and a photosensitive unit 104. The activation of the privacy window is controlled by a controller 106, which may be manual or automatic. For example, a feedback system may be used by the controller to activate the privacy window if a detected light level is high enough to damage the photosensitive unit 104.

The invention claimed is:

1. An apparatus for controlling the transmission of an image from an optical input to an optical output, the apparatus comprising:

a plurality of liquid crystal lenses located in a first layer positioned between the optical input and the optical output, the lenses being arranged side-by-side in a direction substantially perpendicular to a light propagation direction from the optical input to the optical output, the liquid crystal lenses being controllable to change from a state of substantially zero optical power to a state of significantly higher optical power; and a controller for controlling the liquid crystal lenses to change from a first of said states to a second of said states to change the optical power of the lenses such that, in the first state, an accurate image of the optical input is readily obtainable from the optical output while, in the second state, no accurate image is obtainable, and a second layer positioned between the first layer and the optical output, the second layer comprising a material having an enhanced Fresnel reflection at higher incident angles such that light that is substantially perpendicular to the layer passes through it unimpeded while light rays having an angle greater than a predetermined amount are reflected by the layer.

2. An apparatus according to claim 1 wherein, in the first state, the lenses are at zero optical power and, in the second state, the lenses are at said significantly higher optical power.

3. An apparatus for controlling the transmission of an image from an optical input to an optical output, the apparatus comprising:

a plurality of liquid crystal lenses located in a first layer positioned between the optical input and the optical output, the lenses being arranged side-by-side in a direction substantially perpendicular to a light propagation direction from the optical input to the optical output, the liquid crystal lenses being controllable to change from a state of substantially zero optical power to a state of significantly higher optical power; and a controller for controlling the liquid crystal lenses to change from a first of said states to a second of said states to change the optical power of the lenses such that, in the first state, an accurate image of the optical input is readily obtainable from the optical output while, in the second state, no accurate image is obtainable, a second layer of liquid crystal lenses parallel with the first layer and positioned between the first layer and the optical output such that the lenses of the first layer are aligned with the lenses of the second layer in a direction along which light propagates from the optical input and the optical output; and an aperture layer positioned between the first layer and the second layer, the aperture layer being opaque except for a plurality of apertures each aligned substantially with an optical axis passing through a lens of the first layer and a lens of the second layer, the apertures having a cross-sectional area significantly smaller than that of the lenses such that, when the lenses are in a state of relatively low optical power, a majority of light passing through a lens of the first layer is blocked by the aperture layer before reaching the second layer but, when the lenses are in a state of relatively high optical power, the majority of light reaching each lens of the first layer is focused through a corresponding aperture and is incident upon a lens of the second layer, which recollimates said light such that an image of the optical input is readily obtainable at the optical output.

4. An apparatus according to claim 3, wherein, in the first state, the lenses are at zero optical power and, in the second state, the lenses are at said significantly higher optical power.

5. A method of controlling the transmission of an image from an optical input to an optical output, the method comprising:

providing a plurality of liquid crystal lenses located in a first layer positioned between the optical input and the optical output, the lenses being arranged side-by-side in a direction substantially perpendicular to a light propagation direction from the optical input to the optical output, each liquid crystal lens being electrically controllable to change from a state of substantially zero optical power to a state of significantly higher optical power;

controlling the liquid crystal lenses to change from a first of said states to a second of said states to change the optical power of the lenses such that, in the first state, light from the optical input is directed through the lenses to the optical output such that an accurate image of the optical input is readily obtainable from the optical output while, in the second state, light passing through the lenses is not viable for obtaining an accurate image of the optical input from the optical output; and positioning a second layer between the first layer and the optical output, the second layer comprising a material having an enhanced Fresnel reflection at higher incident angles such that light that is substantially perpendicular to the layer passes through it unimpeded while light rays having an angle greater than a predetermined amount are reflected by the layer.

6. A method according to claim 5 wherein, in the first state, the lenses are at zero optical power and, in the second state, the lenses are at said significantly higher optical power.

7. A method of controlling the transmission of an image from an optical input to an optical output, the method comprising:

providing a plurality of liquid crystal lenses located in a first layer positioned between the optical input and the optical output, the lenses being arranged side-by-side in a direction substantially perpendicular to a light propagation direction from the optical input to the optical output, each liquid crystal lens being electrically controllable to change from a state of substantially zero optical power to a state of significantly higher optical power;

controlling the liquid crystal lenses to change from a first of said states to a second of said states to change the optical power of the lenses such that, in the first state, light from the optical input is directed through the lenses to the optical output such that an accurate image of the optical input is readily obtainable from the optical output while, in the second state, light passing through the lenses is not viable for obtaining an accurate image of the optical input from the optical output;

providing a second layer of liquid crystal lenses parallel with the first layer and positioned between the first layer and the optical output such that the lenses of the first layer are aligned with the lenses of the second layer in a direction along which light propagates from the optical input and the optical output; and separating the first layer and the second layer by an aperture layer that is opaque except for a plurality of apertures each aligned substantially with an optical axis passing through a lens of the first layer and a lens of the second layer, the apertures having a cross-sectional area significantly smaller than that of the lenses such that, when the lenses are in a state of relatively low optical power, a majority of light passing through a lens of the first layer is blocked by the aperture layer before reaching the second layer but, when the lenses are in a state of relatively high optical power, the majority of light reaching each lens of the first layer is focused through a corresponding aperture and is incident upon a lens of the second layer, which recollimates said light such that an image of the optical input is readily obtainable at the optical output.

8. A method according to claim 7 wherein, in the first state, the lenses are at zero optical power and, in the second state, the lenses are at said significantly higher optical power.

* * * * *